United States Patent Office 3,322,760
Patented May 30, 1967

3,322,760
6-(SUBSTITUTED-AMINO)-1-TETRALONES
Raphael Pappo, Skokie, Ill., assignor to G. D. Searle & Co., Chicago, Ill., a corporation of Delaware
No Drawing. Filed Oct. 10, 1966, Ser. No. 585,287
Claims priority, application Germany, Sept. 28, 1965, S 99,711
6 Claims. (Cl. 260—247.7)

This application is a continuation-in-part of my application Ser. No. 401,223, filed Oct. 2, 1964, and now abandoned, and of my copending application Ser. No. 494,930, filed Oct. 11, 1965.

The present invention is concerned with novel substituted-amino ketones, wherein the amino substituent contains also an oxygen function and, more particularly, with 6-(substituted-amino)-1-tetralones represented by the following structural formula

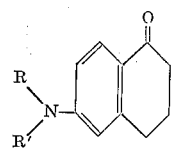

wherein R is an Alk-OH radical and R' is selected from the group consisting of hydrogen and an Alk-OH radical, Alk representing a lower alkylene radical, or R and R' together with the nitrogen atom represent a morpholino radical.

The lower alkylene radicals encompassed by the term Alk in the foregoing structural representation are typified by methylene, ethylene, trimethylene, tetramethylene, pentamethylene and the branched-chain radicals isomeric therewith.

The compounds of this invention exhibit valuable pharmacological properties. Unlike related compositions, they are, in particular, anti-protozoal agents as is evidenced by their ability to inhibit the growth of such organisms as *Tetrahymena gelleii*. In addition, they are anti-inflammatory, pepsin-inhibitory, anti-algal and dicotyledonous seed germination inhibitory agents. A specific alga against which they are particularly effective is *Chlorella vulgaris*.

A starting material suitable for manufacture of the instant compounds is 6-amino-1-tetralone, which is described by Allinger and Jones, J. Org. Chem., 27, 70 (1962). The instant hydroxyalkyl derivatives are conveniently produced by contacting the latter substance with an alkylene oxide or the corresponding alkylene halohydrin.

When an excess of the reagent is used, the instant disubstituted compounds result, while the use of a limited quantity results in the mono-substituted compounds. The process is conveniently conducted at elevated temperature in a closed vessel. 6-amino-1-tetralone dissolved in aqueous dioxane is thus heated with ethylene oxide in a closed vessel at about 190° to afford 6-bis-(2-hydroxyethyl)amino-1-tetralone. When a limited quantity of ethylene oxide is used, 6-(2-hydroxyethyl)amino-1-tetralone is produced.

The instant 6-morpholino derivative is obtained by contacting 6-amino-1-tetralone with bis-(2-chloroethyl) ether in the presence of an alkali metal iodide and a suitable acid acceptor. 6-amino-1-tetralone is thus heated at about 100° in a mixture containing bis-(2-chloroethyl) ether, potassium iodide and potassium carbonate, using N-methyl-2-pyrrolidone as a solvent, to yield 6-morpholino-1-tetralone.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.). Quantities of materials are expressed in parts by weight except where otherwise noted.

Example 1

To a solution of 10 parts of 6-amino-1-tetralone in 130 parts of 10% aqueous dioxane is added 27.3 parts of ethylene oxide, and the resulting reaction mixture is heated in a closed vessel at about 190° for approximately 6 hours. The mixture is cooled to room temperature, and the solvents are removed by distillation under reduced pressure. The resulting residue is extracted into chloroform, and the resulting organic solution is washed with water, dried over anhydrous sodium sulfate and distilled to dryness under reduced pressure. Purification of the resulting crude product first from ether-acetone, then from acetone-benzene yields pure 6-bis-(2-hydroxyethyl)amino-1-tetralone, melting at about 122.5–125.5°. This compound is represented by the following structural formula

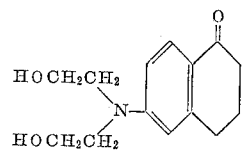

Example 2

When an equivalent quantity of trimethylene oxide is substituted in a procedure of Example 1, there is produced 6-bis-(3-hydroxypropyl)amino-1-tetralone.

Example 3

To a solution of 10 parts of 6-amino-1-tetralone in 130 parts of 10% aqueous dioxane, cooled to approximately −70°, is added 3 parts of ethylene oxide. The resulting mixture is heated in a closed container at approximately 195° for about 6 hours, then is cooled and stripped of solvent under reduced pressure. The resulting residue is extracted into acetone, and the organic solution is decolorized by means of activated carbon. Removal of the acetone by distillation under reduced pressure affords the crude product, which is purified by recrystallization from ether-acetone to yield 6-(2-hydroxyethyl)amino-1-tetralone, melting at about 106–107.5°. This compound is represented by the following structural formula

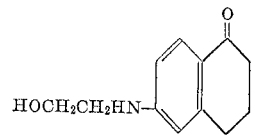

Example 4

When an equivalent quantity of trimethylene oxide is substituted in the procedure of Example 3, there is obtained 6-(3-hydroxypropyl)amino-1-tetralone.

Example 5

Method A.—A mixture of 10 parts of 6-amino-1-tetralone, 57 parts of dimethylformamide, 8 parts of water, 40 parts of sodium iodide and 38 parts of potassium carbonate are heated with stirring to approximately 100° in an atmosphere of nitrogen. While stirring and heating are continued, 23.25 parts of bis-(2-chloroethyl) ether is added dropwise over a period of about 2 hours. After the addition is complete, the reaction mixture is stirred at approximately 105° for about 4½ hours, then is allowed to cool to room temperature and stored for about 16 hours. The solvent is removed by distillation under reduced pressure, and the residue is extracted with chloroform. The chloroform extract is filtered to remove insoluble inorganic salts. Approximately 300 parts of water is added, and the mixture is distilled in order to remove residual bis-(2-chloroethyl) ether. To the residual mixture is then added 100 parts of ethanolamine and 87 parts of toluene, and the resultant mixture is heated at the reflux temperature for about 2 hours. The toluene layer is then separated, and the aqueous layer is extracted with benzene. The benzene and toluene solutions are combined, then washed with water, dried over anhydrous sodium sulfate and concentrated to dryness under reduced pressure. To the resulting oily residue is added methylcyclohexane, and the resulting mixture is heated at the reflux temperature for about 90 minutes, following which time the organic solution is decanted. The oily residue is extracted with an additional quantity of hot methylcyclohexane, and the organic solutions are combined, then distilled to dryness under reduced pressure. The residual product is dissolved in 132 parts of benzene; 9 parts of diatomaceous earth is added, and the mixture is stirred for about 10 minutes, then filtered. The filter cake is washed with benzene, and the washings are combined with the original benzene solution. Distillation of that organic solution to dryness affords a residue, which is purified by crystallization from isopropyl alcohol to afford pure 6-morpholino-1-tetralone, melting at about 95.5–97° and characterized by the following structural formula

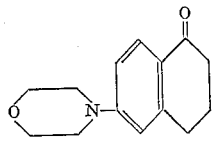

*Method B.*—A mixture containing 3.22 parts of 6-amino-1-tetralone, 7.15 parts of bis-(2-chloroethyl) ether, 3.32 parts of potassium iodide, 7.6 parts of potassium carbonate and 15 parts by volume of N-methyl-2-pyrrolidone is heated at about 105° for approximately 21 hours, at the end of which time 15 parts of water is added in order to promote stirring. Refluxing at approximately 108° is continued for about 8 hours, at the end of which time 85 parts of water is added and the resulting mixture is extracted with benzene. The benzene extract is separated, washed with dilute hydrochloric acid, then dried over anhydrous sodium sulfate and stirred with 5 parts of magnesium silicate. That mixture is filtered through diatomaceous earth, and the filtrate is concentrated to dryness to afford the crude product as a pale brown oil, which crystallizes upon standing. Recrystallization from methylcyclohexane, utilizing magnesium silicate for decolorization, results in pure 6-morpholino-1-tetralone, identical with the product of Method A.

What is claimed is:
1. A compound of the formula

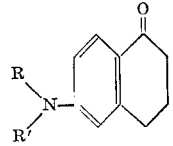

wherein R is an Alk-OH radical and R' is selected from the group consisting of hydrogen and an Alk-OH radical, Alk being a lower alkylene radical, or R and R' together with the nitrogen atom form a morpholino radical.

2. As in claim 1, a compound of the formula

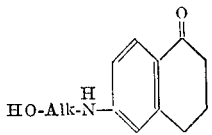

wherein Alk is a lower alkylene radical.

3. As in claim 1, a compound of the formula

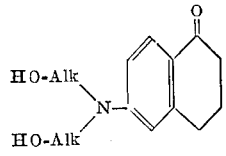

wherein Alk is a lower alkylene radical.

4. As in claim 1, the compound which is 6-bis-(2-hydroxyethyl)amino-1-tetralone.

5. As in claim 1, the compound which is 6-(2-hydroxyethyl)-amino-1-tetralone.

6. As in claim 1, the compound which is 6-morpholino-1-tetralone.

No references cited.

ALEX MAZEL, *Primary Examiner.*

JOSE TOVAR, *Assistant Examiner.*